Dec. 24, 1940. O. E. SEIFFERT 2,226,264
FREEZER.
Filed Jan. 17, 1939 2 Sheets-Sheet 1
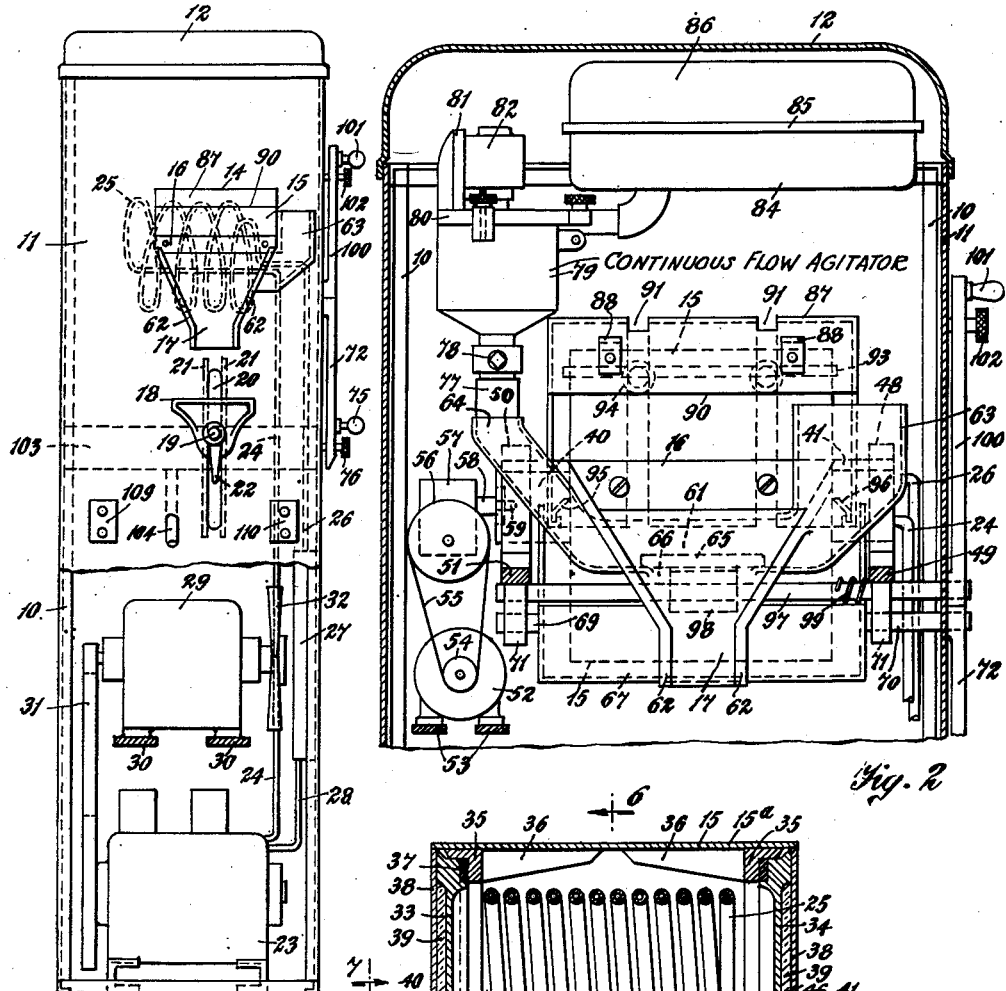
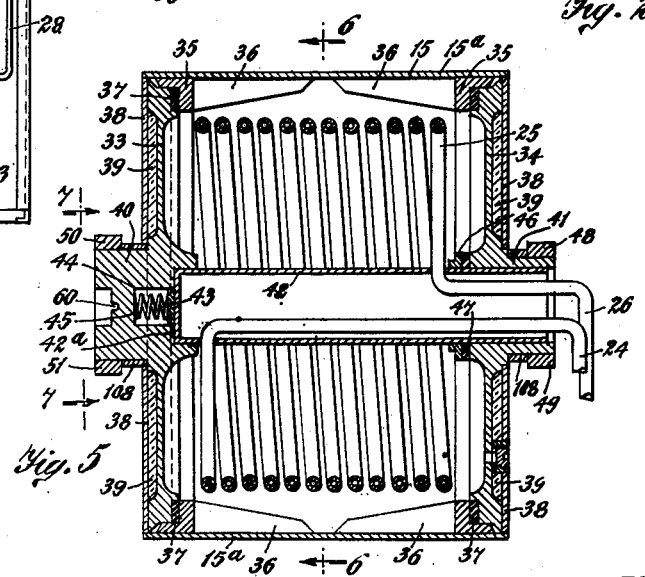
INVENTOR.
OTTO E. SEIFFERT
BY Edward Potter
ATTORNEY.

Dec. 24, 1940.  O. E. SEIFFERT  2,226,264
FREEZER
Filed Jan. 17, 1939  2 Sheets-Sheet 2
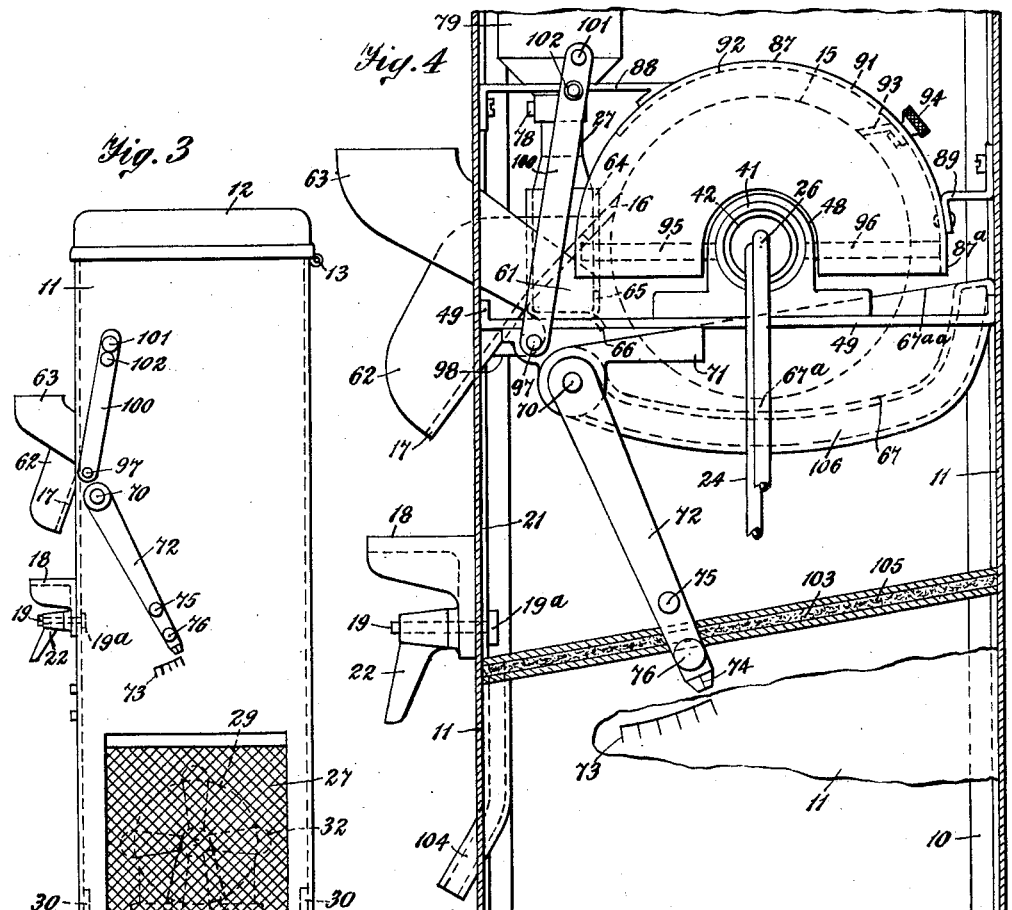
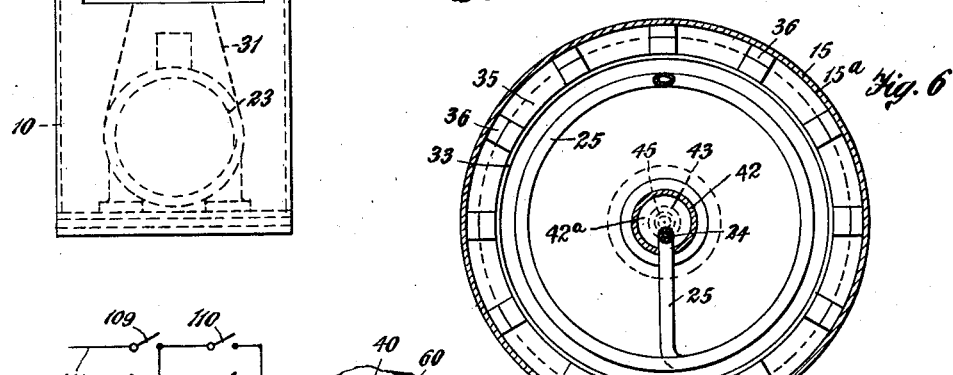
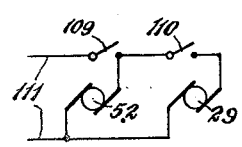
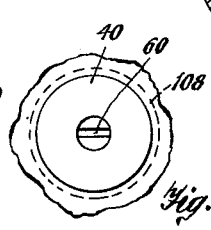
INVENTOR.
OTTO E. SEIFFERT
BY
ATTORNEY.

Patented Dec. 24, 1940

2,226,264

UNITED STATES PATENT OFFICE 2,226,264

FREEZER

Otto E. Seiffert, Union, N. J., assignor to Steril-Icer Corporation of America, Newark, N. J., a corporaton of New Jersey Application January 17, 1939, Serial No. 251,323

19 Claims. (Cl. 62—114)

This invention relates to new and useful improvements in a freezer.

The invention has for an object the construction of a freezer, and a freezer drum of novel construction characterized by a pair of end discs and a cylindrical skirt mounted thereon machined and ground to a smooth finish. The invention proposes the use of a novel scraper operating in conjunction with said drum for scraping deposits of frozen substances from the drum.

As another object it is proposed to provide a stationary pipe extending axially through one of the discs of the freezer drum, to arrange a freezing coil upon said pipe and within the drum and having its ends extending from the extended end of the pipe and to water-proof the drum in a manner so that it may hold a fluid heat conductor, such as brine, from which the heat is adapted to be absorbed by said freezing coil.

Still further the invention proposes a novel arrangement for securing the end discs in position and for connecting the cylindrical skirt with the end discs so that the cylindrical skirt may be readily machined and ground and so that the assembled drum is waterproof for holding the fluid heat conductor such as the brine.

As a further object the invention proposes the use of a basin in conjunction with the freezer drum arranged so that the bottom portion of the drum dips into the basin. An arrangement is also contemplated by which the basin may be fixed in various adjusted positions relative to the freezer drum for controlling the depositing of fluid substance upon the drum as hereinafter more fully described.

As another object of this invention it is proposed to arrange the scraper previously mentioned so that it may resiliently engage the freezer drum and so that it may be held in various finely adjusted positions slightly spaced from the freezer drum.

Still further the invention proposes to construct the basin in the form of a shallow oval, and to arrange the freezer drum to dip into the lowest portion thereof whereby a good control may be had for the depositing of the entire contents of the basin upon the drum.

Another object of this invention resides in so arranging the basin that it may be pivoted in an inoperative position in which it may be easily cleaned.

Still further the invention contemplates the arrangement of a partition beneath the basin to drain off any drip from the basin and to insulate portions of the device as hereinafter more fully explained.

Still further it is proposed to provide heat insulating material upon the freezer drum in a way to assist in maintaining the freezer drum at a desired temperature.

A further object of the invention resides in the provision of a cover for the drum and wipers mounted on the cover to wipe off excess substance from the drum before the substance reaches the scraper previously mentioned.

Still further the invention contemplates a means for requiring the operation of driving means for the freezer drum before it is possible to operate the refrigerator system so as to insure the rotation of the drum and prevent its being frozen in a fixed position.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a front elevational view of a freezer constructed according to this invention, a portion thereof being broken away to disclose interior parts, and the coil of the device being schematically shown to facilitate the understanding of the refrigerating system of the device.

Fig. 2 is a fragmentary vertical sectional view of the upper portion of Fig. 1 directly behind the front plate of the casing thereof.

Fig. 3 is a side elevational view of Fig. 1 looking from the right hand side.

Fig. 4 is a fragmentary enlarged sectional view of a portion of Fig. 3, this section being taken immediately behind the front portion of the casing of the device.

Fig. 5 is an enlarged longitudinal vertical sectional view of the freezer drum per se, and certain parts associated therewith.

Fig. 6 is a transverse vertical sectional view taken on the line 6—6 of Fig. 5.

Fig. 7 is a fragmentary elevational view looking in the direction of the line 7—7 of Fig. 5.

Fig. 8 is a schematic wiring diagram of certain electrical portions of the device.

The freezer, according to this invention, includes a frame 10 preferably constructed from angle iron material covered with sheet metal 11 forming the casing of the device. At the top there is a cover portion 12 which is supported at one side by a hinge 13 so that the top of the casing may be opened. At the front the casing 10 is provided with an opening 14 through which a portion of the freezer drum 15 is exposed. At this portion of the freezer drum there is a scraper 16 which is mounted upon a body having a chute portion 17 discharging to the front of the casing. Beneath the chute portion there is a platform 18 adjustably mounted so that it may be fastened in various vertical positions and adapted to support a container for receiving the frozen material as it is removed by the scraper 16 from the drum 15.

The platform 18 is provided with a screw 19 which passes through a slot 20 formed in the front wall of the casing 11. This screw 19 has a head 19a engaging against a pair of vertical tracks 21 mounted within the casing. A nut 22 is engaged upon the screw 19 and is adapted to be turned for clamping the platform 18 in various elevated positions.

In the bottom of the casing 11 there is a compressor 23 of a refrigerator mechanism. A pipe 24 is connected with compressor 23 and extends upwardly and connects with the coil 25 which is mounted within the drum 15 as hereinafter more fully described. A pipe 26 connects with the other end of the coil 25 and connects with a condenser 27 mounted on the side of the casing 11. From the condenser there is a return pipe 28 connected back to the compressor 23. The details of this refrigerator mechanism will not be given in this specification since it comprises a standard refrigerator unit adapted to cool the coil 25.

An electric motor 29 is supported on the frame 10 by several braces 30. This electric motor is connected by a belt 31 with the refrigerator compressor 23. A fan 32 is mounted on the shaft of the motor 29 and is adapted to cool the condenser 27.

The drum 15 is formed by a pair of end discs 33 and 34 upon which there is mounted a cylindrical skirt 15a. Within the drum 15 and adjacent the end discs 33 and 34 there are a pair of annular members 35 which have a plurality of ribs 36 extending longitudinally of the drum towards each other. Between the annular members 35 and the end discs 33 and 34 there are gaskets 37 encased within overlapping parts of the annular members and the discs. The annular members 35 and the ribs 36 are soldered, welded, or brazed to the skirt 15a. End plates 38 are mounted across the ends of the end discs 33 and 34 and over recesses provided with heat insulating material 39.

The skirt 15a may be made of sheet metal. It is required that the surface of this skirt be very smooth for the proper operation of the freezer. Therefore the skirt should be machined and ground. This is possible because the skirt is rigidly supported by the annular members 35 and the ribs 36. The end disc 33 is provided with a hub portion 40. The end disc 34 is provided with a hub portion 41. The plates 38 rest upon shoulders formed on these hub portions. Preferably, the plates 38 should be soldered, welded or brazed into position to assist in making a waterproof drum. Gaskets 37 serve to waterproof the junction between the annular members 35 and the edge portions of the discs 33 and 34.

A pipe 42 is extended into the drum through the hub 41. This pipe has its inner end 42a closed. A washer 43 engages within an opening 44 in the hub 40 and rests against the closed end 42a of the pipe. An expansion spring 45 is housed in the cavity 44 and urges the washer 43 against the closed end 42a of the pipe 42 for resiliently forcing the pipe towards the hub 41. A collar 46 is fixedly mounted upon the pipe 42 to the inner side of the hub 41. A gasket 47 is interposed between the collar 46 and the hub 41. The spring 45 serves to press the collar 46 against the gasket 47 and so produces a water tight joint at the point where the pipe 42 passes through the hub 41. It should be noted that the drum 15 is consequently sealed. Drum 15 is adapted to hold a fluid heat conductor such as brine. The hub 41 is supported by a bearing 48 which is mounted on a brace 49 connected with the frame 10. The hub 40 is rotatively supported by a bearing 50 which is supported on a brace 51 connected with the frame 10. Consequently, the drum 15 is rotatively supported.

The coil 25 previously referred to is housed within the drum 15 and is fixedly mounted on the pipe 42. The ends of the coil 25 pass through openings in the side walls of the pipe 42 and then emerge from the open end of the pipe. Here the ends of the coil connect with the pipes 24 and 26 previously referred to. The arrangement is such that the drum 15 may rotate while the coil 25 remains stationary.

A means is provided for rotating the drum. This means includes an electric motor 52 within the casing 11 and supported on braces 53 which are connected with the frame 10. The motor 52 is provided with a pinion 54 which is engaged by a belt 55 extending over the drive wheel 56 of a gear reduction unit 57. This gear reduction unit has a driven shaft 58 provided with a key 59 engaging a key slot 60 formed in the hub 40. The motor 52 by reason of the transmission mechanism is adapted to rotate the drum 15.

The scraper 16 (see Fig. 4) extends longitudinally across the drum 15 and is mounted upon a hollow body 61. At the front side this hollow body is formed with flanges 62 defining the chute 17. At one side the hollow body has an inlet portion 63 extending from the exterior of the casing 10 to the interior thereof and connecting with the interior of the hollow body 61 passing to one side of the chute 17. This hollow body 61 has another inlet 64 (see Fig. 2) which is disposed within the casing and which is arranged to one side of the chute 17 and which also connects with the hollow of the body 61. At a point upon the rear side of the hollow body 61 there is a mouth opening 65 at the bottom end of which there is a lip 66 guiding the discharge of material downwards. A basin 67 is mounted beneath the drum 15 and the lip 66. This basin is adapted to receive material from the hollow body discharging through the opening 65 and over the lip 66. The basin 67 is relatively shallow, partially oval shaped, and arranged so that its low point 67a is at the low point of the drum 15.

The basin 67 is supported by a trunnion having trunnion elements 69 and 70. These trunnion elements are rotatively supported in bearings 71 which are mounted on the brackets 49 and 51 used to support the bearings 48 and 50. The trunnion element 70 projects from the side of the casing 11 and at its outer end is provided with a lever 72. This lever is fixedly mounted on the trunnion element and extends downwardly at an angle. The lower end of the lever is adapted to work across a scale 73 imprinted on the side wall of the casing 11. The lower end of the lever 72 is also provided with an imprinted line 74 adapted to indicate the position of the basin 67 in conjunction with the lines of the scale 73. It is proposed to so arrange the parts that the basin may be in a raised position when a small quantity of substance is placed in the basin, or the basin may be lowered to adapt it to receive a larger quantity of substance. The lever 72 is provided with a handle 75 by which it may be moved. A set screw 76 threadedly engages through the lever 72 and is adapted to abut against the casing 11 for holding the lever in a desired fixed position.

The inlet 64 connects with a flexible pipe 77 which connects with a valve 78 on the bottom end of a continuous flow agitator 79. This agitator is for the purpose of whipping cream or doing general mixing. The agitator 79 has a removable cover 80 upon which there is a bracket 81 which supports an electric motor 82 connected to operate the agitator. The agitator has an inlet 83 which is connected with a tank 84 from which substance to be frozen may be stored and supplied. The tank 84 is provided with a cover plate 85 upon which there is a second tank 86. Tank 86 is adapted to hold dry ice. The tanks 84 and 86 are accessible when the cover 12 of the device is open.

A semi-cylindrical cover 87 engages over the top drum 15 and is supported by several brackets 88 and 89 which are connected with the frame 10. At the front the cover 87 is formed with an opening 90 through which the scraper 16 extends. At the rear and at the top there are several slots 91 formed in the material of the cover. These slots extend from the bottom edge 87a of the cover up to a point 92 (see Fig. 4). A longitudinal wiper 93 engages drum 15 and is supported by several clamp screws 94 passing through the slots 91. These clamp screws 94 may be loosened and then the wiper 93 may be shifted upwardly or downwardly and fixed in desired positions. Also the wiper 93 may be removed from the rear bottom edge of the cover 87. End wipers 95 and 96 are mounted on the ends of the cover 87 and engage the ends of the drum 15. The wiper 95 is located at the left side of the drum (see Fig. 2) while the wiper 96 is at the right side. Each of these end wipers extends from opposite sides of the hubs 40 and 41 radially of the drum 15.

The hollow body 61 is supported by a rod 97 which is attached to a lug 98 mounted on the underside of the hollow body. This rod 97 is rotatively supported in a portion of the bearings 71. A spring 99 is arranged coaxially on the rod 97 and acts between the rod and one of the bearings 71 for normally producing a torque to pivot the hollow body 61 to cause the scraper 16 to resiliently engage the side of the drum 15. One end of the rod 97 extends from the casing 11 and this end is provided with a lever 100. This lever extends upwardly and at its upper end is provided with a handle 101 by which it may be conveniently moved. A set screw 102 threadedly engages through the lever and abuts the casing 11 and is adapted to hold the lever in various fixed positions. With this arrangement it is possible to adjust the lever 100 to slightly space the scraper 16 any desired small distance from the drum 15.

A downwardly inclined partition 103 is arranged transversely across the frame 10 beneath the basin 67. A drain pipe 104 connects with the lower end of the partition 103 and discharges outside of the casing 11. The partition 103 is protected by heat insulating material 105. The basin 67 is also protected by heat insulating material 106. The basin 67 has end walls 67aa. Collars 108 are mounted on the hubs 40 and 41 to cause the hubs to be properly spaced from the bearings 48 and 49 (see Fig. 5).

On the front of the casing there is a switch 109 and another switch 110 for controlling the motor 52 and the motor 29, respectively. Motor 52 is connected in a circuit 111 (see Fig. 8) which is controlled by switch 109. The motor 29 is connected in parallel with the motor 52 and in this parallel circuit the switch 110 is located. The arrangement is such that should the switch 110 be closed while the switch 109 is open the motor 29 will remain inoperative as it will not receive current. It is necessary that the main switch 109 be closed first. The purpose of this is to make sure that the drum 15 is rotating before the motor 29 is set into operation. Otherwise there would be the possibility that the drum 15 would become frozen in the basin 67.

The operation of the device is as follows:

A fluid substance requiring to be agitated such as cream, may be placed in the tank 84. This fluid substance may be preserved by dry ice placed in the tank 86. The switch 109 is then closed to set the drum 15 rotating. Then the agitator 79 is set into operation by motor 82 to supply a continuous flow of the substance from the tank 84. This substance will enter the inlet 64, pass down the hollow body 61, discharge from the opening 65 over the lip 66, and to the basin 67. The switch 110 is closed to set the refrigerator unit into operation. Heat from the drum 15 will be absorbed by the cooled brine within the drum. Soon the substance in the basin 67 will start freezing upon the surface of the drum. The wipers 95, 96 and 93 will wipe excess soft frozen material from the drum. The scraper 16 is then placed in operation, either by setting it a desired distance from the drum or by releasing the set screw 102 so that the spring 99 resiliently urges the scraper against the drum. The scraper will scrape off the frozen substance which will discharge down the chute 17 into a vessel placed upon the platform 18. The basin 67 may be lowered if too much substance is being carried up by the drum. Adjustment of the basin may be had by loosening the set screw 75 and moving the lever 72 by gripping the handle 76.

In the event that it is desired to freeze a beverage such as Coca Cola or other similar substance, the material may be poured into the inlet where it will flow into the hollow body 61, discharge through the opening 65 and over the lip 66 and into the basin 67. From the basin the fluid will be picked up by the drum and frozen. The scraper 16 will discharge the frozen beverage over the chute 17 in the form of "ices".

While I have illustrated and described my invention with some degree of particularity, I realize that in practice various alterations therein may be made. I therefore point out that the form of the details of construction or other changes in the arrangement of the correlated parts may be made, without departing from the spirit or the scope of the appended claims.

Having thus described my invention, what I claim as new and desire to secure by United States Letters Patent is:

1. In a freezer, a freezer drum having a pair of end discs and a cylindrical skirt mounted thereon and adapted to hold a fluid heat conductor, a stationary pipe extended axially through one of said discs, a freezing coil mounted on said pipe and within said drum and having its ends extending from the extended end of said pipe, means for rotatively supporting said drum, means for revolving said drum, and means for waterproofing said drum at the projecting area of said pipe, a pair of annular members within the drum and bearing against said skirt, and gaskets interposed between said annular members and discs for waterproofing the drum at these areas.

2. In a freezer, a freezer drum having a pair of end discs and a cylindrical skirt mounted thereon and adapted to hold a fluid heat conductor, a stationary pipe extended axially through one of said discs, a freezing coil mounted on said pipe and within said drum and having its ends extending from the extended end of said pipe, means for rotatively supporting said drum, means for revolving said drum, and means for waterproofing said drum at the projecting area of said pipe, a pair of annular members within the drum and bearing against said skirt, and gaskets interposed between said annular members and discs for waterproofing the drum at these areas, and longitudinally extending ribs on said annular members and extending along said cylindrical skirt and attached thereto for supporting the skirt and for agitating the fluid during the rotation of the drum.

3. In a freezer, a freezer drum having a pair of end discs and a cylindrical skirt mounted thereon and adapted to hold a fluid heat conductor, a stationary pipe extended axially through one of said discs, a freezing coil mounted on said pipe and within said drum and having its ends extending from the extended end of said pipe, means for rotatively supporting said drum, means for revolving said drum, and means for waterproofing said drum at the projecting area of said pipe, a pair of annular members within the drum and bearing against said skirt, gaskets interposed between said annular members and discs for waterproofing the drum at these areas, a flange mounted on said pipe within the drum, a gasket interposed between the said flange and one of said end discs, and resilient means acting between the other end discs and said pipe for compressing said interposed gasket.

4. In a freezer, a freezer drum having a pair of end discs and a cylindrical skirt mounted thereon and adapted to hold a fluid heat conductor, a stationary pipe extended axially through one of said discs, a freezing coil mounted on said pipe and within said drum and having its ends extending from the extended end of said pipe, means for rotatively supporting said drum, means for revolving said drum, and means for waterproofing said drum at the projecting area of said pipe, a pair of annular members within the drum and bearing against said skirt, gaskets interposed between said annular members and discs for waterproofing the drum at these areas, a flange mounted on said pipe within the drum, a gasket interposed between the said flange and one of said end discs, and resilient means acting between the other end discs and said pipe for compressing said interposed gasket, said spring being housed within a cavity in the end disc and acting against a closed end of said pipe.

5. In a freezer, a freezer drum having a pair of end discs and a cylindrical skirt mounted thereon and adapted to hold a fluid heat conductor, a stationary pipe extended axially through one of said discs, a freezing coil mounted on said pipe and within said drum and having its ends extending from the extended end of said pipe, means for rotatively supporting said drum, means for revolving said drum, and means for waterproofing said drum at the projecting area of said pipe, a pair of annular members within the drum and bearing against said skirt, gaskets interposed between said annular members and discs for waterproofing the drum at these areas, and heat insulating material mounted upon the outer faces of said end discs, and plates engaged over said end discs to hold the heat insulating material in position.

6. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot rod for supporting said body, and resilient means for urging said scraper on to said drum comprising a spring coaxial on said pivot rod and acting between said rod and a stationary portion of said freezer.

7. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot rod for supporting said body, resilient means for urging said scraper on to said drum comprising a spring coaxial on said pivot rod and acting between said rod and a stationary portion of said freezer, and means for holding said scraper lifted slightly off from said drum, including said pivot rod, and means for holding said pivot rod in various fixed positions.

8. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, and means for holding said scraper lifted slightly off from said drum, including a rod connected with said hollow body and pivotally supported on and extending from said freezer, a lever mounted on the extended end of said rod, and means for holding said lever in various fixed positions.

9. In a freezer, a freezer drum rotatively supported, a basin into which said drum dips, a scraper extending longitudinally across said drum, a hollow body supporting said scraper and having a chute portion continuing downwardly from said scraper and a compartment extending between said scraper and formed with a discharge mouth emptying into said basin and said compartment having inlet portions extending upwardly to the sides of said scraper, a pivot for supporting said body, resilient means for urging said scraper on to said drum, said basin being of shallow oval form and arranged with its low point disposed immediately below the low point of said freezer drum.

10. In a freezer, a freezer drum rotatively supported, a basin into which said drum dips, a scraper extending longitudinally across said drum, a hollow body supporting said scraper and having a chute portion continuing downwardly from said scraper and a compartment extending between said scraper and formed with a discharge mouth emptying into said basin and said compartment having inlet portions extending upwardly to the sides of said scraper, a pivot for supporting said body, resilient means for urging said scraper on to said drum, said basin being of shallow oval form and arranged with its low point disposed immediately below the low point of said freezer drum, and means for holding said basin in various adjusted positions to space it from the low point of said freezer drum.

11. In a freezer, a freezer drum rotatively supported, a basin into which said drum dips, a scraper extending longitudinally across said drum, a hollow body supporting said scraper and having a chute portion continuing downwardly from said scraper and a compartment extending between said scraper and formed with a discharge mouth emptying into said basin and said compartment having inlet portions extending upwardly to the sides of said scraper, a pivot for supporting said body, resilient means for urging said scraper on to said drum, said basin being of shallow oval form and arranged with its low point disposed immediately below the low point of said freezer drum, and means for holding said basin in various adjusted positions to space it from the low point of said freezer drum, said means including a trunnion mounted on said freezer and supporting said basin, a lever mounted on one of the trunnion elements, and means for holding said lever in various adjusted positions.

12. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, and an inclined partition disposed beneath said basin to catch overflow and drippings therefrom, and a drain connected with the low point of said partition.

13. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, and a platform for supporting a container adjustably mounted on said freezer below said discharge mouth.

14. In a freezer, a freezer drum rotatively supported, a basin into which said drum dips, a scraper extending longitudinally across said drum, a hollow body supporting said scraper and having a chute portion continuing downwardly from said scraper and a compartment extending between said scraper and formed with a discharge mouth emptying into said basin and said compartment having inlet portions extending upwardly to the sides of said scraper, a pivot for supporting said body, resilient means for urging said scraper on to said drum, and said basin being provided with a layer of heat insulation material on the bottom side thereof.

15. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, a semi-cylindrical cover mounted over the top portion of said drum and stationarily supported in said freezer, end wipers mounted on said cover and engaging the ends of said drum, and a longitudinal wiper engaging the drum and adjustably mounted circumferentially on the cover.

16. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, and a continuous agitator mounted on one of said inlet portions for feeding substance to said basin.

17. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, and a continuous agitator mounted on one of said inlet portions for feeding substance to said basin, a tank for holding the substance to be supplied to the agitator, and a dry ice compartment for preserving the substance contained in said tank.

18. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin, and said compartment having inlet portions extending upwardly to the sides of said scraper, a pivot for supporting said body, resilient means for urging said scraper on to said drum, a refrigeration system for cooling said freezer drum including a refrigerator compressor, motor and a condenser, and a motor with a fan for cooling said condenser.

19. In a freezer, a freezer drum rotatively supported, a basin into which said drum dips, a scraper extending longitudinally across said drum, a hollow body supporting said scraper and having a chute portion continuing downwardly from said scraper and a compartment extending beneath said scraper and formed with a discharge mouth emptying into said basin and said compartment having inlet portions extending upwardly to the sides of said scraper, a pivot for supporting said body, resilient means for urging said scraper on to said drum, means for rotating said freezer drum, a refrigeration system for cooling said freezer drum, and means for rotating said freezer drum in advance of operation of the refrigeration system.

OTTO E. SEIFFERT.